(12) United States Patent
Nam et al.

(10) Patent No.: US 10,330,889 B2
(45) Date of Patent: Jun. 25, 2019

(54) PLANAR VARIFOCAL LENS

(71) Applicant: SAMSUNG ELECTRONICS CO., LTD., Suwon-si (KR)

(72) Inventors: Sunghyun Nam, Yongin-si (KR); Junghyun Park, Seoul (KR); Sanghun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 15/677,670

(22) Filed: Aug. 15, 2017

(65) Prior Publication Data

US 2018/0081150 A1   Mar. 22, 2018

(30) Foreign Application Priority Data

Sep. 19, 2016   (KR) .................. 10-2016-0119553

(51) Int. Cl.
*G02B 13/00*   (2006.01)
*G02F 1/03*    (2006.01)
(Continued)

(52) U.S. Cl.
CPC ......... *G02B 13/0015* (2013.01); *G02B 1/002* (2013.01); *G02B 3/0081* (2013.01);
(Continued)

(58) Field of Classification Search
CPC .................. G02B 1/002; G02B 3/0081; G02B 5/18–5/1895; G02B 7/10; G02B 13/0015;
(Continued)

(56) References Cited

U.S. PATENT DOCUMENTS 3,305,294 A   2/1967  Alvarez
3,507,565 A * 4/1970  Alvarez .................. A61B 3/04
                                                351/159.42
(Continued)

FOREIGN PATENT DOCUMENTS

JP   2009-80152 A    4/2009
JP   4486122 B2      6/2010
(Continued)

OTHER PUBLICATIONS

Guangya Zhou et al., "Microelectromechanically-driven miniature adaptive Alvarez lens", Optics Express 1226, vol. 21, No. 1, Jan. 14, 2013, 8 pages.
(Continued)

*Primary Examiner* — Lin Ye
*Assistant Examiner* — Chriss S Yoder, III
(74) *Attorney, Agent, or Firm* — Sughrue Mion, PLLC

(57) ABSTRACT

A varifocal lens includes a first phase plate including a plurality of first phase conversion elements having different sizes from each other, and a second phase plate including a plurality of second phase conversion elements having different sizes from each other, where the first phase plate and the second phase plate face each other along an optical axis and are movable relative to each other in a direction perpendicular to the optical axis to create displacement between the first phase plate and the second phase plate, and the plurality of first phase conversion elements and the plurality of second phase conversion elements are configured so that light transmitted through the first phase plate and the second phase plate is focused on different positions on the optical axis depending on the displacement between the first phase plate and the second phase plate.

27 Claims, 16 Drawing Sheets

(51) Int. Cl.
    G02B 7/10    (2006.01)
    G02B 1/00    (2006.01)
    G02B 3/00    (2006.01)
    G02B 5/18    (2006.01)
(52) U.S. Cl.
    CPC .............. G02B 7/10 (2013.01); G02F 1/0311 (2013.01); *G02B 5/1809* (2013.01); *G02B 2207/107* (2013.01)
(58) Field of Classification Search
    CPC ........... G02B 2207/107; G03F 7/70191; G03F 7/70308; G01J 1/0414; G01J 3/021; G01J 5/0809; G02F 1/0311
    See application file for complete search history.

(56) References Cited

U.S. PATENT DOCUMENTS

| | | | | |
|---|---|---|---|---|
| 4,759,607 | A * | 7/1988 | Kawatsuki | G02B 5/1857 359/574 |
| 8,400,555 | B1 * | 3/2013 | Georgiev | H04N 5/23212 348/222.1 |
| 8,885,139 | B2 | 11/2014 | Peyghambarian et al. | |
| 9,713,526 | B2 | 7/2017 | Rombach | |
| 2014/0285905 | A1 * | 9/2014 | Zhou | G03B 5/02 359/696 |
| 2015/0370092 | A1 | 12/2015 | Nisper et al. | |
| 2016/0266387 | A1 * | 9/2016 | Tekolste | G02B 27/0172 |

FOREIGN PATENT DOCUMENTS

| | | |
|---|---|---|
| JP | 2013-47823 A | 3/2013 |
| KR | 10-1465028 B1 | 11/2014 |
| WO | 2017044637 A1 | 3/2017 |
| WO | WO 2017044637 * | 3/2017 |

OTHER PUBLICATIONS

Chunning Huang et al. "Design and fabrication of a micro Alvarez lens array with a variable focal length" Microsystems Technologies, vol. 15, No. 4, Sep. 30, 2008, (pp. 559-563) XP019719669.

Shane Colburn et al. "Metasurface-based freeform optics for biosensing and augmented reality systems" 2016 Conference on lasers and electro-optics (CLEO), OSA, Jun. 5, 2016, (pp. 1-2) XP033024495.

Communication dated Mar. 28, 2018, issued by the European Patent Office in counterpart European Application No. 17189006.4.

* cited by examiner

Φ₁ (Cross-section)

Φ₂ (Cross-section)

PLANAR VARIFOCAL LENS

CROSS-REFERENCE TO RELATED APPLICATION

This application claims priority from Korean Patent Application No. 10-2016-0119553, filed on Sep. 19, 2016 in the Korean Intellectual Property Office, the disclosure of which is incorporated herein in its entirety by reference.

BACKGROUND

1. Field

Methods and apparatuses consistent with the exemplary embodiment disclosed herein relate to varifocal lenses in which focus changes as focal length changes, and more particularly, to varifocal lenses capable of being fabricated in a planar form with a small thickness.

2. Description of the Related Art

Similar to compact cameras and cameras for mobile devices, mirrorless cameras and single-lens reflex cameras are being fabricated to have smaller sizes. Accordingly, lenses for small cameras are required. Until now, most lenses for small cameras have been designed as fixed focus lenses, that is, lenses with a fixed focal length. However, since the angle of view of the fixed focal length lens is fixed, it is difficult to take a picture with various effects. In particular, compact cameras or cameras for mobile devices are generally designed to be suitable for close-up photography, and thus, may not be suitable for long-distance photography.

A multifocal lens having multiple focal lengths or a zoom lens having a variable focal length is widely used as a lens for taking pictures from both a short distance away from the object being photographed and a long distance away from the object being photographed. However, since the zoom lens is usually composed of a plurality of lens elements, a camera using the zoom lens is long and heavy.

SUMMARY

Exemplary embodiments provide varifocal lenses.

According to an aspect of an exemplary embodiment, there is provided a varifocal lens including: a first phase plate including a plurality of first phase conversion elements, at least some of the plurality of first phase conversion elements having different sizes from each other; and a second phase plate including a plurality of second phase conversion elements, at least some of the plurality of second phase conversion elements having different sizes from each other, wherein the first phase plate and the second phase plate face each other along an optical axis and are movable relative to each other in a direction perpendicular to the optical axis to create displacement between the first phase plate and the second phase plate, and the plurality of first phase conversion elements and the plurality of second phase conversion elements are configured so that light transmitted through the first phase plate and the second phase plate is focused on different positions on the optical axis depending on the displacement between the first phase plate and the second phase plate.

The first phase plate may further include a first substrate that is transparent and the plurality of first phase conversion elements may be provided on the first substrate, and the second phase plate may further include a second substrate that is transparent and the plurality of second phase conversion elements may be provided on the second substrate.

Each of the plurality of first phase conversion elements and each of the plurality of the second phase conversion elements may include a material having a refractive index higher than a refractive index of the first substrate and the second substrate.

Each of the first substrate and the second substrate may have a flat plate shape, and the first phase plate and the second phase plate may be arranged so that the plurality of first phase conversion elements and the plurality of second phase conversion elements face each other.

The first phase plate may further include a first dielectric layer filled between the plurality of first phase conversion elements and the second phase plate may further include a second dielectric layer filled between the plurality of second phase conversion elements, and the first dielectric layer and the second dielectric layer may be transparent.

A thickness of the first dielectric layer may be greater than thicknesses of the plurality of first phase conversion elements so that the first dielectric layer completely covers the plurality of first phase conversion elements and a thickness of the second dielectric layer may be greater than thicknesses of the plurality of second phase conversion elements so that the second dielectric layer completely covers the plurality of second phase conversion elements.

The first phase plate and the second phase plate may be configured so that the first dielectric layer and the second dielectric layer are in contact with each other.

Each of the plurality of first phase conversion elements and the plurality of second phase conversion elements may have a cylindrical shape.

The plurality of first phase conversion elements may have different diameters from each other depending on positions of the plurality of first phase elements on the first phase plate so that a phase of light transmitted through the first phase plate changes differently depending on the positions of the plurality of first phase conversion elements on the first phase plate, and the plurality of second phase conversion elements may have different diameters from each other depending on positions of the plurality of second phase elements on the second phase plate so that a phase of light transmitted through the second phase plate changes differently depending on the positions of the plurality of second phase conversion elements on the second phase plate.

The diameters of the plurality of first phase conversion elements and the diameters of the plurality of second phase conversion elements may be determined so that a phase of light transmitted through the first phase plate and the second phase plate satisfies an Alvarez-Lohmann condition.

An arrangement of the plurality of second phase conversion elements may be mirror-symmetrical with an arrangement of the plurality of first phase conversion elements.

The first phase plate and the second phase plate may be movable relative to each other in a direction perpendicular to an axis of symmetry between the plurality of first phase conversion elements and the plurality of second phase conversion elements.

Thicknesses of the plurality of first phase conversion elements may be equal to thicknesses of the plurality of second phase conversion elements.

The varifocal lens may further include: a third phase plate including a plurality of third phase conversion elements, at least some of the plurality of third phase conversion elements having different sizes from each other; and a fourth phase plate including a plurality of fourth phase conversion elements, at least some of the plurality of fourth phase conversion elements having different sizes from each other, wherein the plurality of first phase conversion elements and the plurality of second phase conversion elements may be configured so that the first phase plate and the second phase plate collectively function as a first lens element, and the plurality of third phase conversion elements and the plurality of fourth phase conversion elements may be configured so that the third phase plate and the fourth phase plate collectively function as a second lens element.

The first phase plate, the second phase plate, the third phase plate, and the fourth phase plate may be sequentially provided along the optical axis, the third phase plate and the fourth phase plate may be movable relative to each other in a direction perpendicular to the optical axis to create displacement between the third phase plate and the fourth phase plate, and the plurality of third phase conversion elements and the plurality of fourth phase conversion elements may be configured so that light transmitted through the third phase plate and the fourth phase plate is focused on different positions on the optical axis depending on the displacement between the third phase plate and the fourth phase plate.

Each of the plurality of third phase conversion elements and the fourth phase conversion elements may have a cylindrical shape, the plurality of third phase conversion elements may have different diameters from one another depending on positions of the third phase conversion elements on the third phase plate so that a phase of light transmitted through each of the third phase conversion elements on the third phase plate changes differently from one another depending on the positions of the third phase conversion elements on the third phase plate, and the plurality of fourth phase conversion elements may have different diameters from one another depending on positions of the fourth phase conversion elements on the fourth phase plate so that a phase of light transmitted through each of the fourth phase conversion elements on the fourth phase plate changes depending on the positions of the fourth phase conversion elements on the fourth phase plate.

The first phase plate may include a first region in which the plurality of first phase conversion elements are provided and a second region in which the plurality of first phase conversion elements are provided, and the second phase plate may include a third region in which the plurality of second phase conversion elements are provided and a fourth region in which the plurality of second phase conversion elements are provided.

The first phase plate and the second phase plate may be configured so that the first region and the third region face each other and the second region and the fourth region face each other.

The plurality of first phase conversion elements and the plurality of second phase elements may be configured so that the first region and the second region collectively function as a first lens element and the third region and the fourth region collectively function as a second lens element.

An arrangement of the plurality of first phase conversion elements in the first region and an arrangement of the plurality of first phase conversion elements in the second region may be identical to each other, and an arrangement of the plurality of second phase conversion elements in the third region and an arrangement of the plurality of second phase conversion elements in the fourth region may be identical to each other.

The first lens element and the second lens element may have a same focal length as each other at a certain displacement between the first phase plate and the second phase plate.

An arrangement of the plurality of first phase conversion elements in the first region and an arrangement of the plurality of first phase conversion elements in the second region may be different from each other, and an arrangement of the plurality of second phase conversion elements in the third region and an arrangement of the plurality of second phase conversion elements in the fourth region may be different from each other.

The first lens element and the second lens element may have different focal lengths from each other at a certain displacement between the third phase plate and the fourth phase plate.

According to an aspect of another exemplary embodiment, there is provided an image acquisition device including: a varifocal lens including: a first phase plate including a plurality of first phase conversion elements, at least some of the plurality of first phase conversion elements having different sizes from each other, and a second phase plate including a plurality of second phase conversion elements, at least some of the plurality of second phase conversion elements having different sizes from each other; an actuator configured to move the first phase plate and the second phase plate to create displacement between the first phase plate and the second phase plate; a controller configured to control the actuator; and an image pickup device, wherein the first phase plate and the second phase plate may face each other along an optical axis and may be movable relative to each other in a direction perpendicular to the optical axis to create the displacement, and the plurality of first phase conversion elements and the plurality of second phase conversion elements may be arranged so that light transmitted through the first phase plate and the second phase plate is focused on different positions on the optical axis depending on the displacement between the first phase plate and the second phase plate.

The image acquisition device may further include at least one optical lens element.

Additional aspects will be set forth in part in the description which follows and, in part, will be apparent from the description, or may be learned by practice of the presented embodiments.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
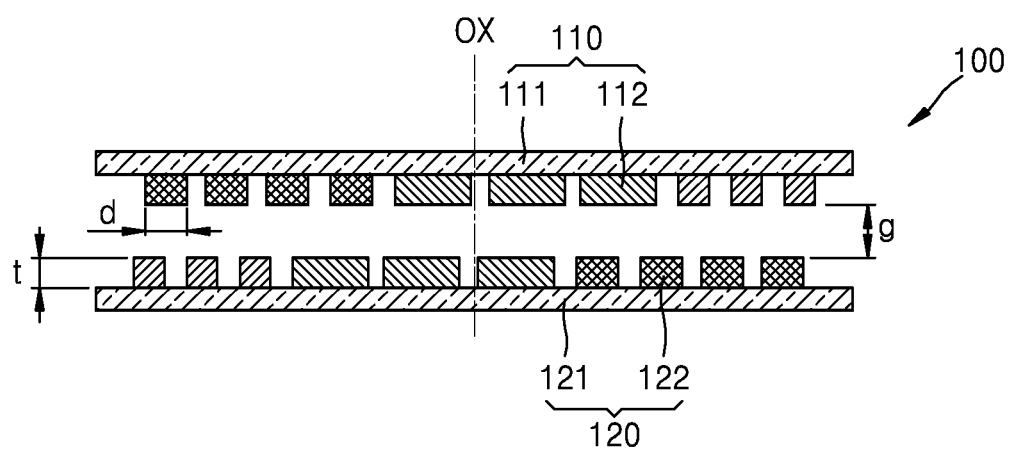
FIG. 1 is a cross-sectional view of a varifocal lens according to an exemplary embodiment.

Hereinafter, with reference to the accompanying drawings, a planar varifocal lens will be described in detail. Like reference numerals refer to like elements throughout, and in the drawings, sizes of elements may be exaggerated for clarity and convenience of explanation. The embodiments described below are merely exemplary, and various modifications of the exemplary embodiments may be possible. In a layer structure described below, an expression such as "above" or "on" may include not only the meaning of "immediately on/under/to the left/to the right in a contact manner", but also the meaning of "on/under/to the left/to the right in a non-contact manner".

FIG. 1 is a cross-sectional view of a varifocal lens 100 according to an exemplary embodiment. Referring to FIG. 1, the varifocal lens 100 according to the exemplary embodiment may include a first phase plate 110 and a second phase plate 120 arranged to face each other along an optical axis OX and configured to be movable relative to each other in a direction perpendicular to the optical axis OX. The first phase plate 110 may include a first substrate 111, which is transparent, and a plurality of first phase conversion elements 112 arranged two-dimensionally on one surface of the first substrate 111 facing the second phase plate 120. The second phase plate 120 may include a second substrate 121, which is transparent, and a plurality of second phase conversion elements 122 arranged two-dimensionally on one surface of the second substrate 121 facing the first phase plate 110. That is, the first phase plate 110 and the second phase plate 120 may be disposed so that the first phase conversion elements 112 and the second phase conversion elements 122 face each other. The first phase conversion element 112 and the second phase conversion element 122 may not be contact with each other so that damage does not occur when the first phase plate 110 and the second phase plate 120 move relative to each other. According to an exemplary embodiment, the first phase conversion element 112 and the second phase conversion element 122 may be spaced apart from each other by a distance g.

Figure 2:
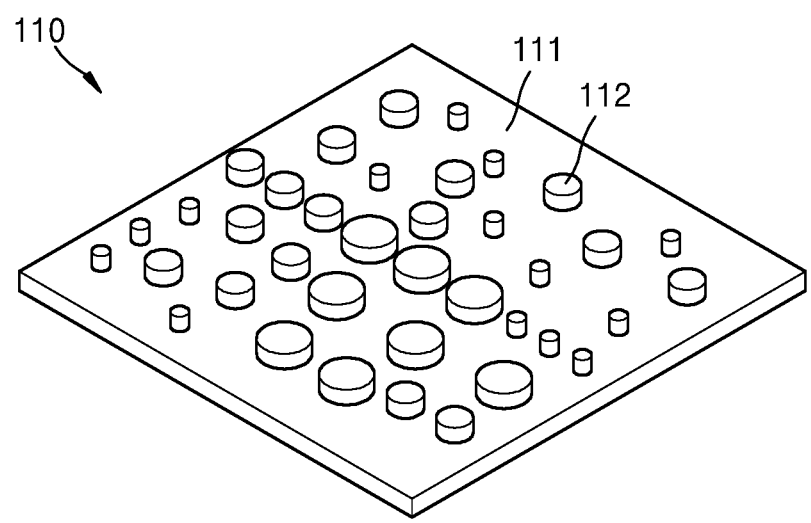
FIG. 2 is a perspective view of a phase plate of the varifocal lens shown in FIG. 1.

The first phase conversion element 112 and the second phase conversion element 122 may protrude above the surface of the first substrate 111 and the surface of the second substrate 121, respectively. FIG. 2 is an exemplary perspective view of the first phase plate 110 of the varifocal lens 100 shown in FIG. 1. As shown in FIG. 2, the first phase conversion elements 112 may be two-dimensionally arranged on the first substrate 111 to form a predetermined pattern. Each of the first phase conversion elements 112 may have, for example, a cylindrical shape. Each of the second phase conversion elements 122 may also have a cylindrical shape. However, the shapes of the first and second phase conversion elements 112 and 122 do not necessarily have to be cylindrical. The first and second phase conversion elements 112 and 122 may be formed using a general semiconductor patterning process, although are not limited thereto and may also be formed using many other types of processes. For example, after stacking the material layers of the first and second phase conversion elements 112 and 122 on the surfaces of the first and second substrates 111 and 121, respectively, the first and second phase conversion elements 112 and 122 may be formed simply by patterning the material layers by using a photolithography process or some other type of process known to those skilled in the art.

The first substrate 111 and the second substrate 121 may include, for example, a transparent glass plate, a transparent plastic material, or a combination thereof. The first and second phase conversion elements 112 and 122 may include a material having a refractive index higher than refractive indices of the first and second substrates 111 and 121. For example, the first and second phase conversion elements 112 and 122 may include a high refractive index material, such as germanium (Ge), amorphous silicon (a-Si), polycrystalline silicon (p-Si), monocrystalline silicon (c-Si), group III-V compound, $TiO_2$, or $SiN_x$, although is not limited thereto. For example, the refractive index of the first and second phase conversion elements 112 and 122 may be greater than 3.5 at a visible light wavelength or other wavelength, including, but not limited to, UV, visible, or infrared. It is understood, of course, that the refractive index of the first and second phase conversion elements 112 and 122 may also be equal to or less than 3.5.

When an incident light passes through the first and second phase conversion elements 112 and 122 having the high refractive indexes, the phase of the incident light is delayed by the first and second phase conversion elements 112 and 122, and the phase of a transmitted light transmitted through the first and second phase conversion elements 112 and 122 is different from the phase of the incident light. The extent to which the phase of the incident light changes may be determined depending on the sizes and the thicknesses t of the first and second phase conversion elements 112 and 122. If the first and second phase conversion elements 112 and 122 are, for example, cylindrical, the phase of the transmitted light changes depending on the diameters d and the thicknesses t of the first and second phase conversion elements 112 and 122.

Figure 3:
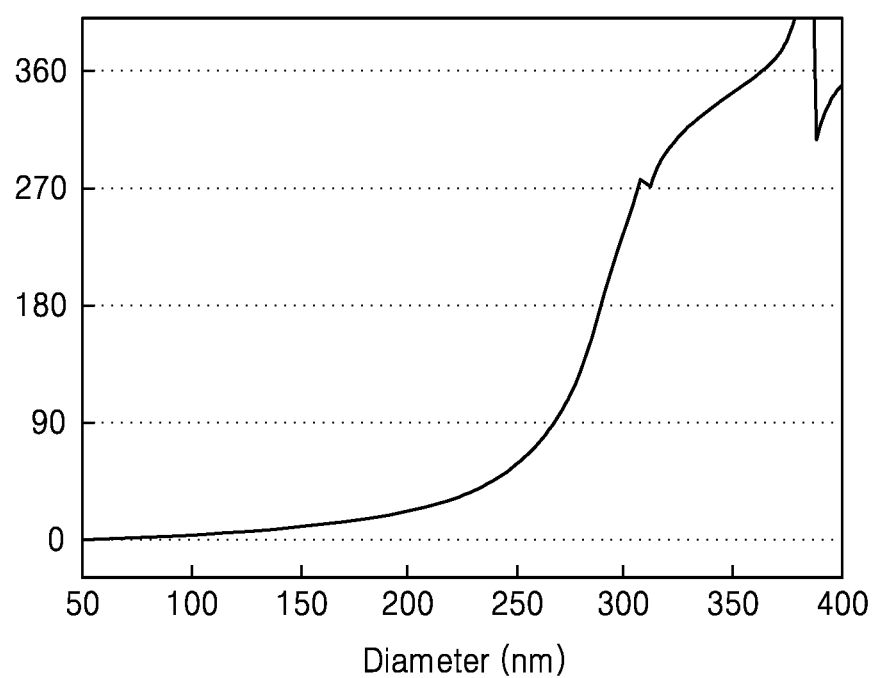
FIG. 3 is a graph illustrating the relationship between the diameter of one of the phase conversion elements arranged in a phase plate and a phase change of transmitted light.

For example, FIG. 3 is a graph illustrating the relationship between the diameter of one of the first and second phase conversion elements 112 and 122, respectively arranged in the first and second phase plates 110 and 120, and a phase change of the transmitted light. In the graph of FIG. 3, it is assumed that each of the first and second phase conversion elements 112 and 122 includes amorphous silicon with a lattice constant of 600 nm and has a thickness of 750 nm. However, exemplary embodiments are not limited thereto. For example, the first and second phase conversion elements 112 and 122 may include materials other than, or in addition to, amorphous silicon, and may have a lattice constant of more or less than 600 nm and a thickness of more or less than 750 nm. Referring to FIG. 3, the diameters of the first and second phase conversion elements 112 and 122 and the phase change are not linearly related, but instead are non-linearly related. As shown in FIG. 3, the phase change increases as the diameters of the first and second phase conversion elements 112 and 122 increase.

Accordingly, when at least some of the first and second phase conversion elements 112 and 122 have different sizes or different thicknesses, the transmitted light transmitted through the first and second phase plates 110 and 120 may have different phases depending on positions of the first and second phase conversion elements 112 and 122 on the first and second plates 110 and 120. That is, the phase of the transmitted light changes locally depending on the positions of the first and second phase conversion elements 112 and 122 on the first and second phase plates 110 and 120. By appropriately arranging the first and second phase conversion elements 112 and 122 having different sizes or different thicknesses, it is possible to control, as desired, the wave front of the transmitted light transmitted through the first and second phase plates 110 and 120. For example, depending on the arrangement of the first and second phase conversion elements 112 and 122, the first and second phase plates 110 and 120 may serve as refractive optical elements such as lenses. The first and second phase plates 110 and 120 may also serve as other types of optical elements in addition to or instead of lenses.

According to the present exemplary embodiment, the arrangement of the first and second phase conversion elements 112 and 122 may be designed so that phase characteristics of the transmitted light have a cubic function satisfying an Alvarez-Lohmann lens condition, and the first phase plate 110 and the second phase plate 120 may be disposed to face each other. In this configuration, when the first phase plate 110 and the second phase plate 120 are displaced relative to each other in a direction perpendicular to the optical axis OX, the total phase change of the varifocal lens 100, which is caused by a combination of the first phase plate 110 and the second phase plate 120, varies depending on the relative displacement between the first phase plate 110 and the second phase plate 120. For example, the refractive power of the varifocal lens 100 may be changed according to the relative displacement and the displacement direction of the first phase plate 110 and the second phase plate 120 so that the focal length of the varifocal lens 100 is changed. To achieve this feature, the first and second phase conversion elements 111 and 122 may be arranged so that light transmitted through the first phase plate 110 and the second phase plate 120 is focused on different positions on the optical axis OX according to the displacement between the first phase plate 110 and the second phase plate 120.

Figure 4A:
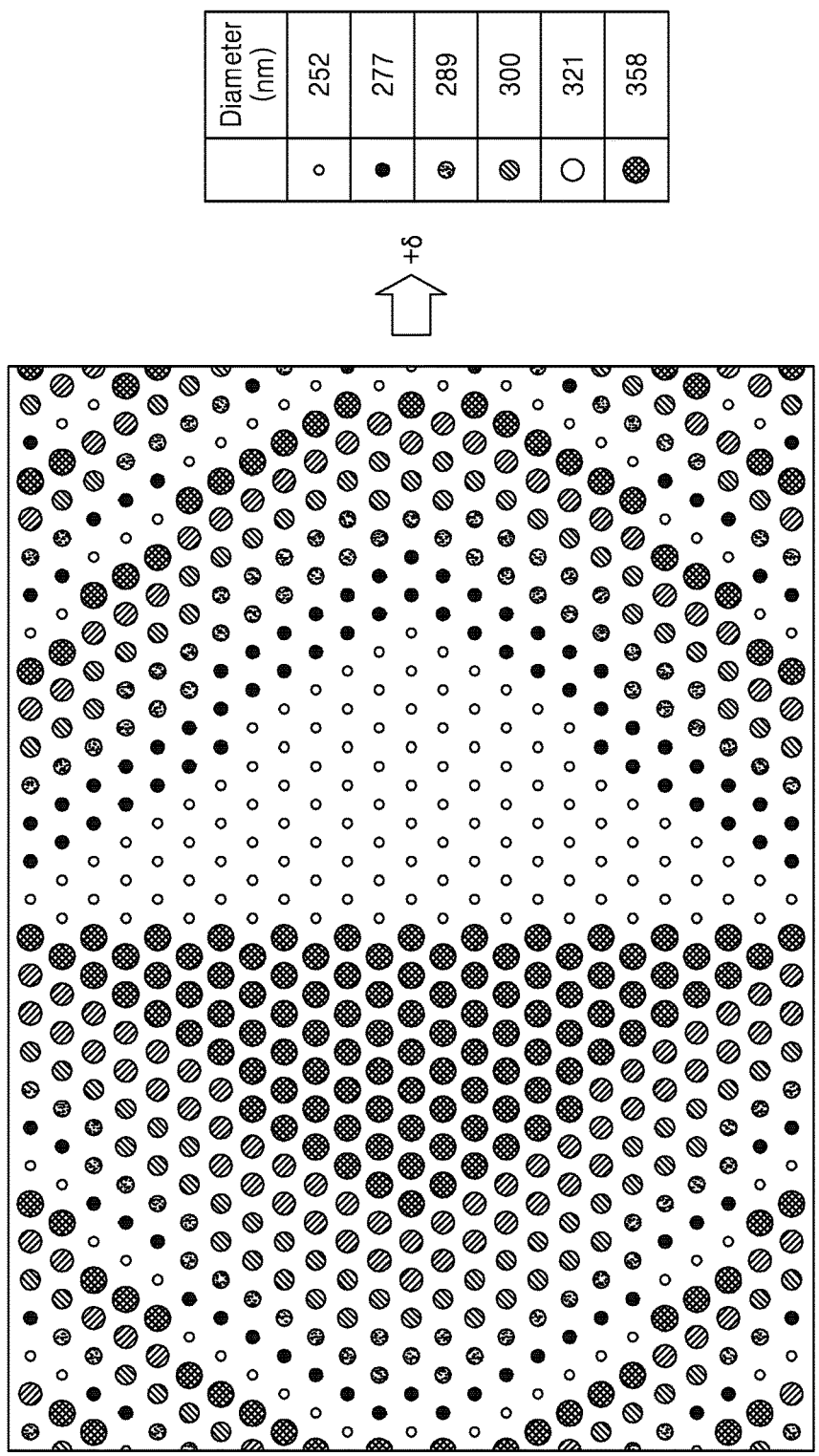
FIG. 4A is a plan view illustrating the arrangement of a plurality of first phase conversion elements of a first phase plate, according to an exemplary embodiment.
Figure 4B:
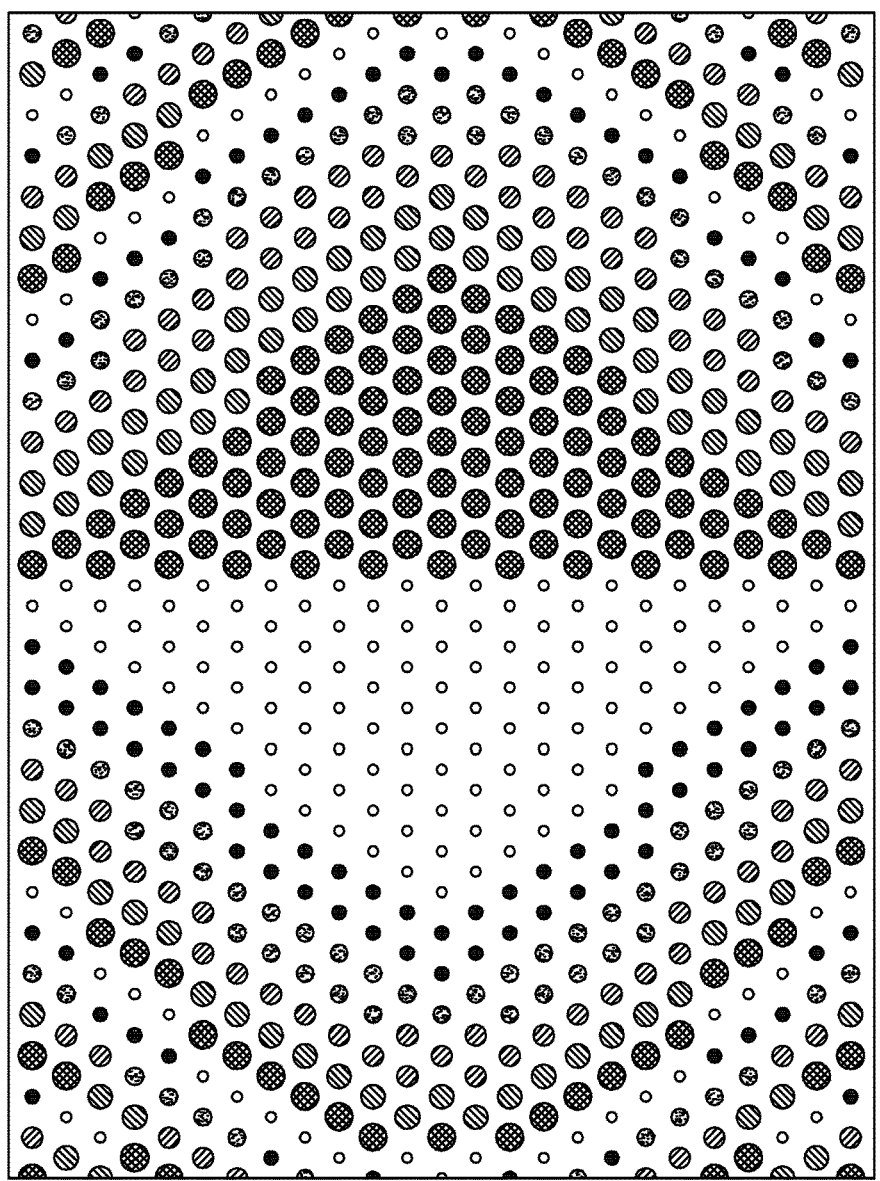
FIG. 4B is a plan view illustrating the arrangement of a plurality of second phase conversion elements of a second phase plate, according to an exemplary embodiment.

For example, FIG. 4A is a plan view illustrating the arrangement of a plurality of first phase conversion elements 112 of the first phase plate 110, according to an exemplary embodiment, and FIG. 4B is a plan view illustrating the arrangement of a plurality of second phase conversion elements 122 of the second phase plate 120, according to an exemplary embodiment. Referring to FIGS. 4A and 4B, the plurality of first phase conversion elements 112 have different diameters depending on their positions on the first phase plate 110 so that the phase of light transmitted through the first phase plate 110 changes differently depending on the positions of the first phase conversion elements 112 on the first phase plate 110. Similarly, the plurality of second phase conversion elements 122 have different diameters depending on their positions on the second phase plate 120 so that the phase of light transmitted through the second phase plate 120 changes differently depending on the positions of the plurality of second phase conversion elements 122 on the second phase plate 120. The diameters of the first phase conversion elements 112 are illustratively shown in FIG. 4A, and the diameters of the second phase conversion elements 122 are illustratively shown in FIG. 4B. The diameters of the plurality of first phase conversion elements 112, which depend on their positions on the first phase plate 110, and the diameters of the plurality of second phase conversion elements 122, which depend on their positions on the second phase plate 120, may be selected so that the phase of light transmitted through the first phase plate 110 and the second phase plate 120 satisfies an Alvarez-Lohmann condition as shown in Equation 1.

$$\phi = A\left(xy^2 + \frac{1}{3}x^3\right) + Dx + E \qquad \text{[Equation 1]}$$

In Equation 1, $\phi$ represents a phase change of transmitted light, x and y represent coordinates when the center of the varifocal lens 100 is the origin of an xy coordinate system, and A, D, and E are arbitrary constants.

When the phase change $\phi$ at a position of each of the first and second phase plates 110 and 120 is determined, the diameters of the first and second phase conversion elements 112 and 122 at the respective positions of the first and second phase plates 110 and 120 may be determined based on the relationship between the diameters of the first and second phase conversion elements 112 and 122 and a phase change of transmitted light, illustrated in FIG. 3. The phase change of the transmitted light may be affected by the thicknesses of the first and second phase conversion elements 112 and 122. However, when the thicknesses of the first and second phase conversion elements 112 and 122 are different from each other, a process of manufacturing the first and second phase plates 110 and 120 may be complicated, and thus, in the exemplary embodiments of FIGS. 4A and 4B, the thicknesses of the first and second phase conversion elements 112 and 122 are fixed at 750 nm. It is understood that the thicknesses of the first and second phase conversion elements 112 and 122 are not limited to being fixed at 750 nm, and may instead be fixed at many other thicknesses as well.

In the exemplary embodiment of FIG. 4A, the plurality of first phase conversion elements 112 are designed to be symmetric based on a horizontal center line of the first phase plate 110. Similarly, in the exemplary embodiment of FIG. 4B, the plurality of second phase conversion elements 122 are designed to be symmetric based on a horizontal center line of the second phase plate 120. The arrangement of the first phase conversion elements 112 of the first phase plate 110 and the arrangement of the second phase conversion elements 122 of the second phase plate 120 are mirror-symmetrical with respect to each other in a horizontal direction. Accordingly, a phase change due to the first phase plate 110 and a phase change due to the second phase plate 120 may be the other way around. In this case, the first phase plate 110 and the second phase plate 120 may be displaced in a direction perpendicular to the axis of symmetry between the first phase conversion element 112 and the second phase conversion element 122, that is, in the horizontal direction. It is understood that the first phase plate 110 and the second phase plate 120 are not limited to being displaced in a direction perpendicular to the axis of symmetry, and may instead be displayed at various other angles relative to the axis of symmetry, according to design considerations.

Figure 5A:
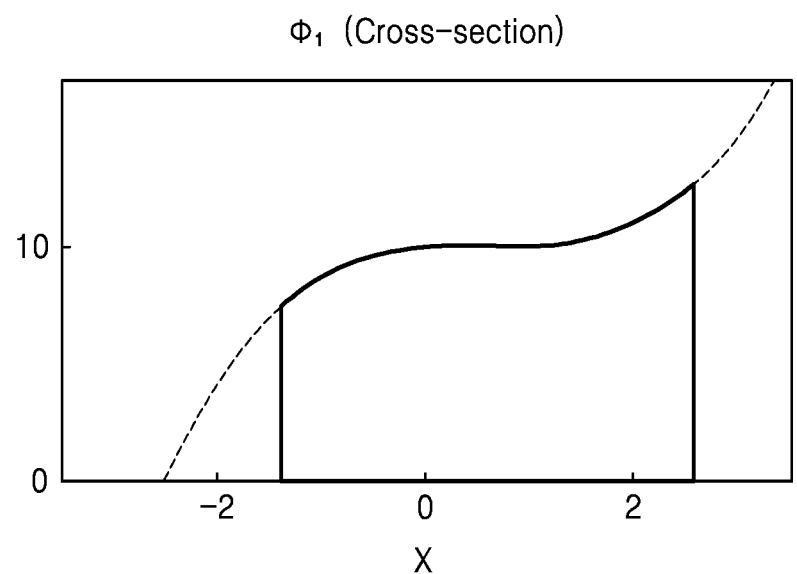
FIGS. 5A, 5B, and 5C are diagrams illustrating a phase map of transmitted light transmitted through a first phase plate, a phase map of transmitted light transmitted through a second phase plate, and a resultant phase map of transmitted light output from a varifocal lens, respectively, when the displacement between the first phase plate and the second phase plate is 0.6 mm.
Figure 5B:
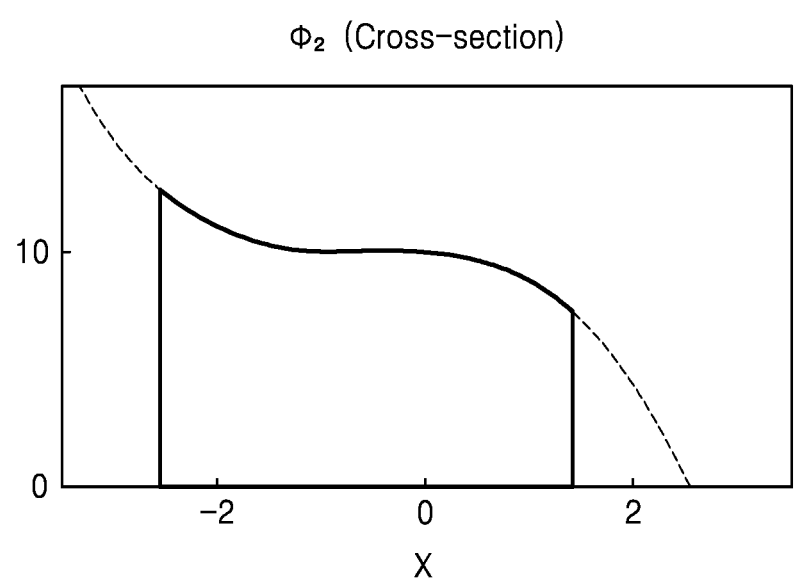
Figure 5C:
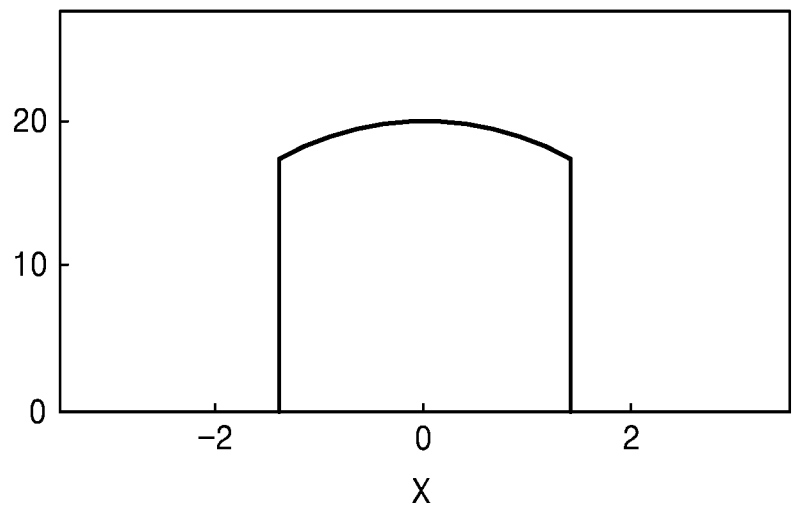

FIGS. 5A, 5B, and 5C are diagrams illustrating a phase map of transmitted light transmitted through the first phase plate 110, a phase map of transmitted light transmitted through the second phase plate 120, and a resultant phase map of transmitted light output from the varifocal lens 100, respectively, when the displacement between the first phase plate 110 and the second phase plate 120 is 0.6 mm. In the examples of FIGS. 5A to 5C, it is assumed that the first phase conversion element 112 and the second phase conversion element 122 have the arrangement shown in FIG. 4A and the arrangement shown in FIG. 4B, respectively. It is further assumed that the first substrate 111 and the second substrate 121 include glass and the first and second phase conversion elements 112 and 122 include amorphous silicon (a-Si). It is also assumed that the heights of the first and second phase conversion elements 112 and 122 are 750 nm and the incident light is infrared light having a wavelength of 850 nm. In the graphs of FIGS. 5A to 5C, the horizontal axis represents the displacement, the unit of the horizontal axis is mm, the vertical axis represents the phase, and the unit of the vertical axis is kilo-radian. It is understood that the heights of the first and second phase conversion elements 112 and 122 are not limited to being 750 nm, and may instead be greater or less than 750 nm. It is further understood that the incident light is not limited to being infrared light having a wavelength of 850 nm, and may instead be light having a wavelength greater or less than 850 nm (e.g., visible light, ultraviolet, etc.).

According to an exemplary embodiment, the term displacement refers to a relatively shifted distance between the first phase plate 110 and the second phase plate 120. When the first phase plate 110 moves to the right with respect to the second phase plate 120, a moving direction is indicated as a positive (+) direction, and when the first phase plate 110 moves to the left with respect to the second phase plate 120, the moving direction is indicated as a negative (−) direction. Referring to FIGS. 5A and 5B, the phase map of the transmitted light transmitted through the first phase plate 110 and the phase map of the transmitted light transmitted through the second phase plate 120 are symmetrical with respect to each other, as described above. The phase map of the transmitted light transmitted through the first phase plate 110 is shifted to the right by 0.6 mm from the phase map of the transmitted light transmitted through the second phase plate 120. Then, the resultant phase map of the varifocal lens 100 obtained by combining the phase map by the first phase plate 110 and the phase map by the second phase plate 120 has a convex shape indicating a positive refractive power, as shown in FIG. 5C. Thus, in this case, the varifocal lens 100 may serve as a convex lens having a focal length of about 25 mm.

Figure 6A:
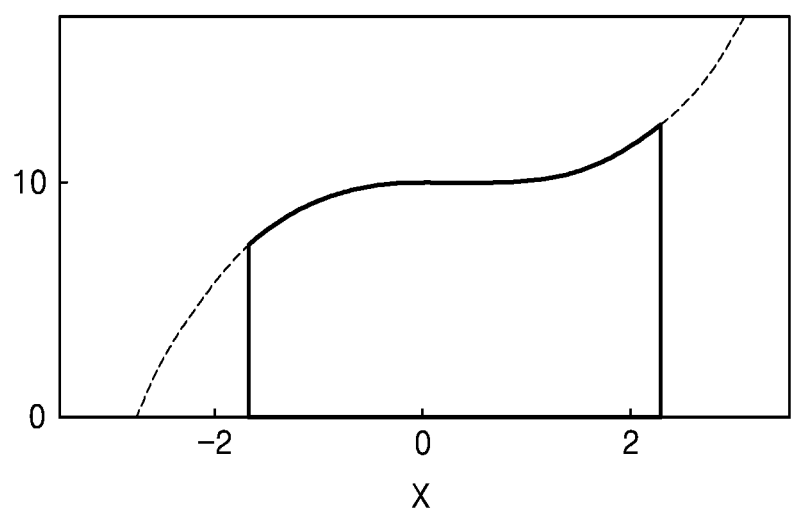
FIGS. 6A, 6B, and 6C are diagrams illustrating a phase map of transmitted light transmitted through a first phase plate, a phase map of transmitted light transmitted through a second phase plate, and a resultant phase map of transmitted light output from a varifocal lens, respectively, when the displacement between the first phase plate and the second phase plate is 0.3 mm.
Figure 6B:
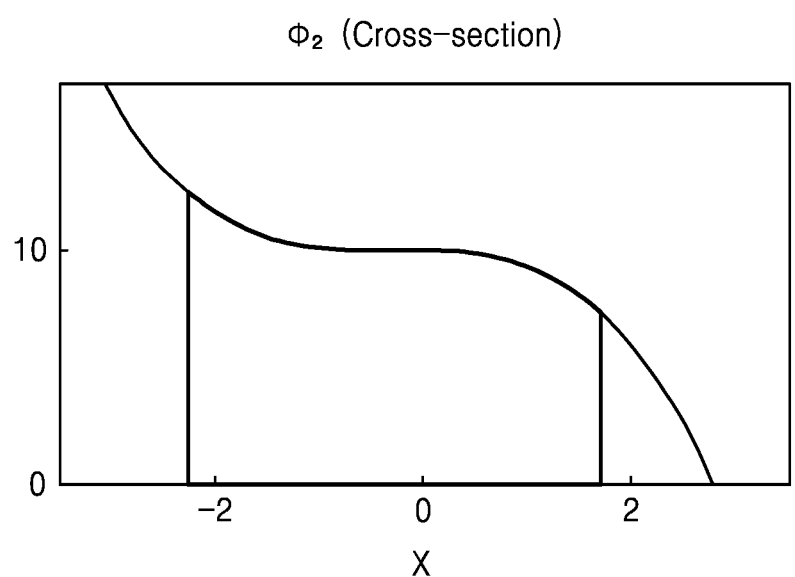
Figure 6C:
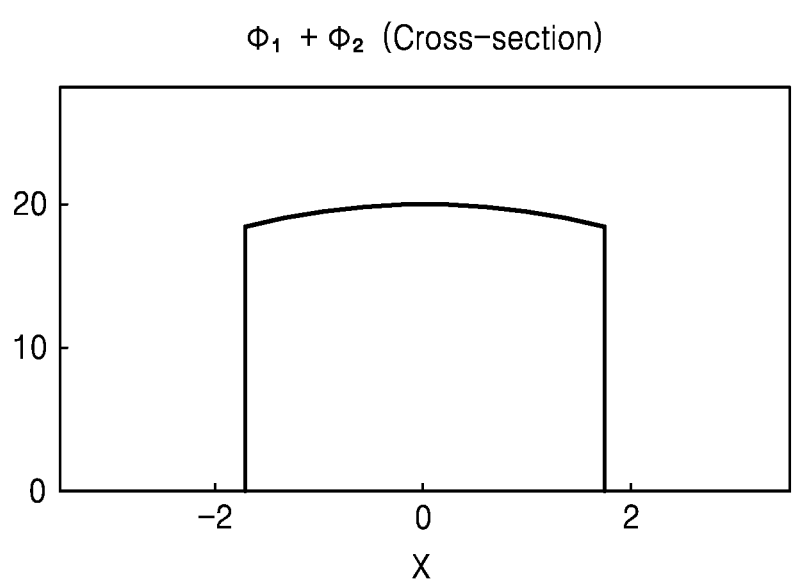

FIGS. 6A, 6B, and 6C are diagrams illustrating a phase map of transmitted light transmitted through the first phase plate 110, a phase map of transmitted light transmitted through the second phase plate 120, and a resultant phase map of transmitted light output from the varifocal lens 100, respectively, when the displacement between the first phase plate 110 and the second phase plate 120 is 0.3 mm. As shown in FIGS. 6A to 6C, when the phase map of the transmitted light transmitted through the first phase plate 110 and the phase map of the transmitted light transmitted through the second phase plate 120 are gradually moved closer to each other, the refractive power of the varifocal lens 100 may become smaller and smaller. For example, the varifocal lens 100 may serve as a convex lens having a focal length of about 50 mm.

Figure 7A:
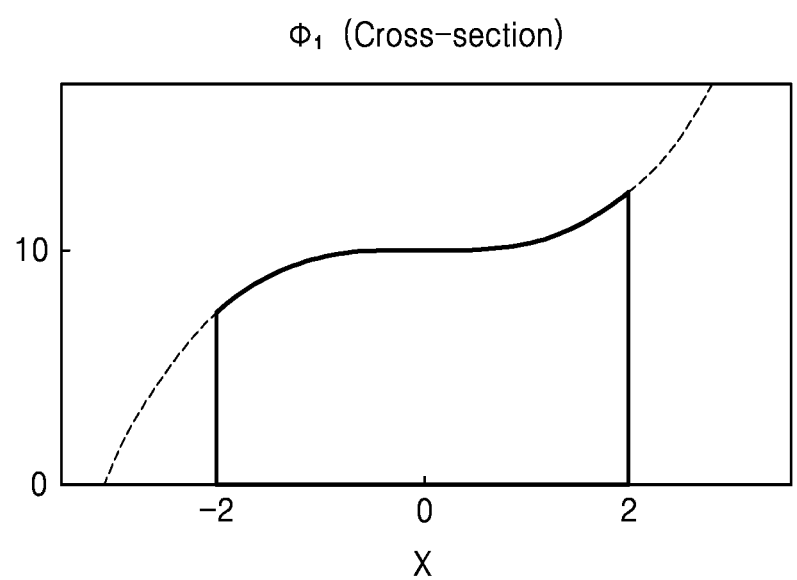
FIGS. 7A, 7B, and 7C are diagrams illustrating a phase map of transmitted light transmitted through a first phase plate, a phase map of transmitted light transmitted through a second phase plate, and a resultant phase map of transmitted light output from a varifocal lens, respectively, when the displacement between the first phase plate and the second phase plate is 0 mm.
Figure 7B:
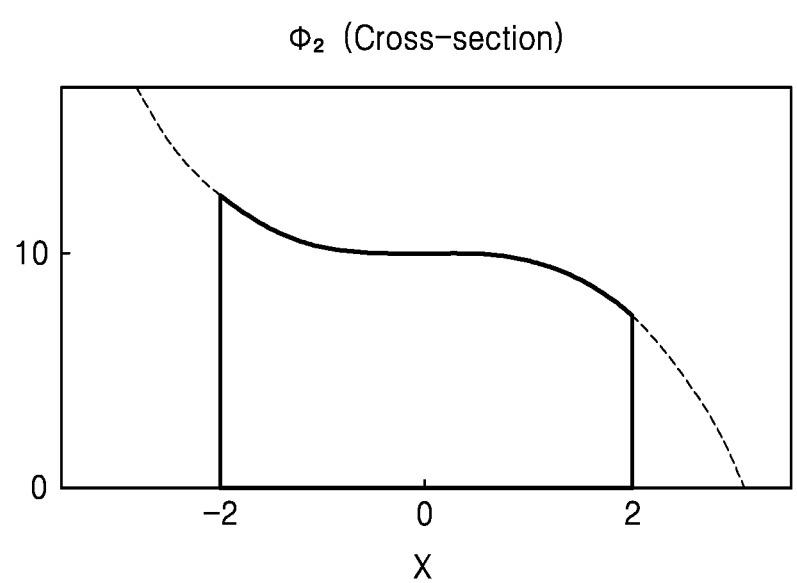
Figure 7C:
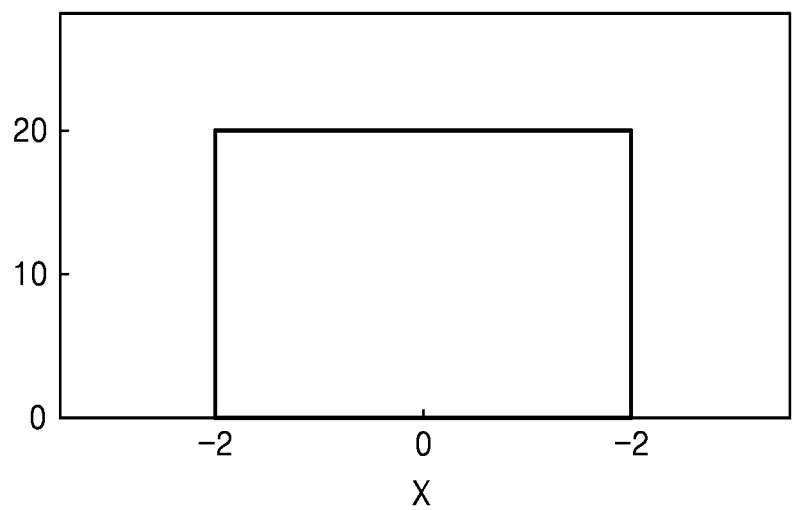

FIGS. 7A, 7B, and 7C are diagrams illustrating a phase map of transmitted light transmitted through the first phase plate 110, a phase map of transmitted light transmitted through the second phase plate 120, and a resultant phase map of transmitted light output from the varifocal lens 100, respectively, when the displacement between the first phase plate 110 and the second phase plate 120 is 0 mm. When the first phase plate 110 and the second phase plate 120 completely overlap each other, a phase change by the first phase plate 110 and a phase change by the second phase plate 120 cancel each other out. Then, as shown in FIG. 7C, the refractive power of the varifocal lens 100 becomes zero like a flat plate. In this case, the focal length of the varifocal lens 100 is infinite ($\infty$).

Figure 8A:
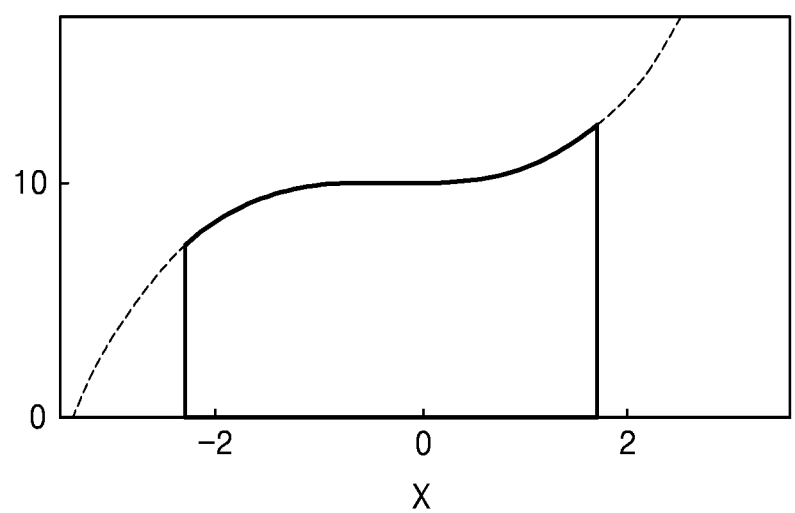
FIGS. 8A, 8B, and 8C are diagrams illustrating a phase map of transmitted light transmitted through a first phase plate, a phase map of transmitted light transmitted through a second phase plate, and a resultant phase map of transmitted light output from a varifocal lens, respectively, when the displacement between the first phase plate and the second phase plate is −0.3 mm.
Figure 8B:
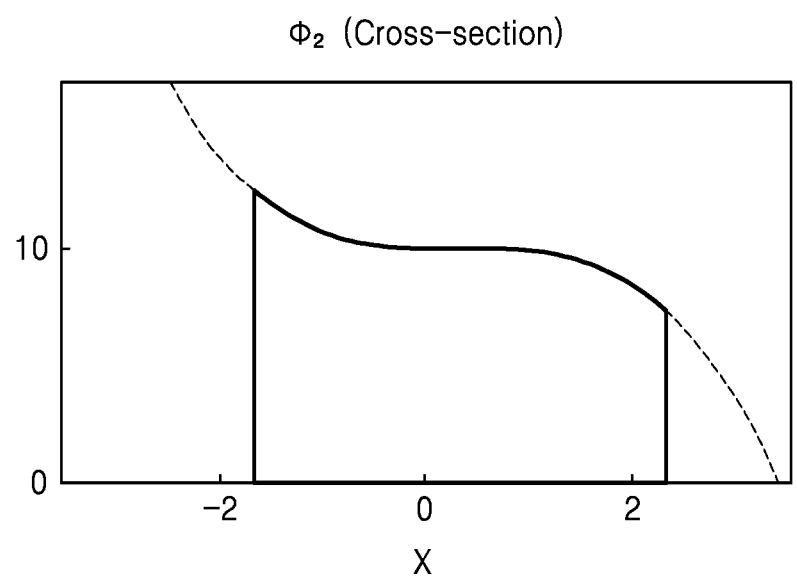
Figure 8C:
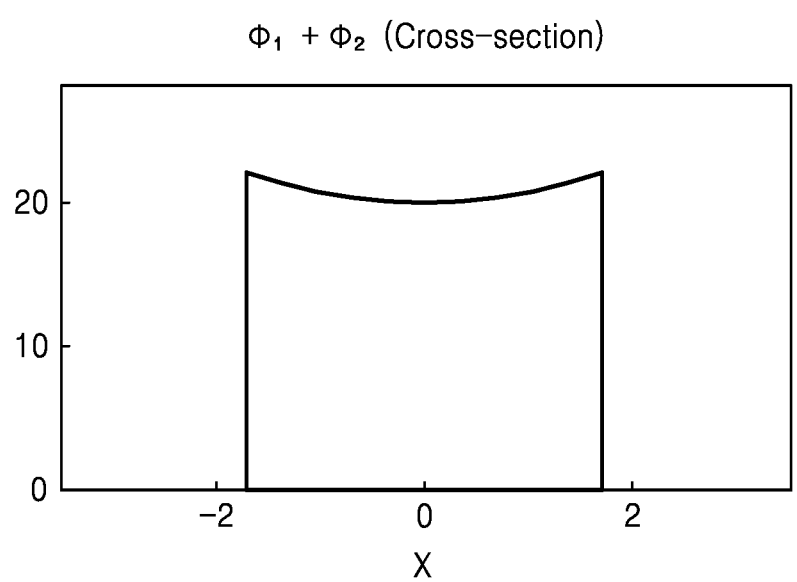

FIGS. 8A, 8B, and 8C are diagrams illustrating a phase map of transmitted light transmitted through the first phase plate 110, a phase map of transmitted light transmitted through the second phase plate 120, and a resultant phase map of transmitted light output from the varifocal lens 100, respectively, when the displacement between the first phase plate 110 and the second phase plate 120 is −0.3 mm. Referring to FIGS. 8A and 8B, when the displacement is negative, the phase map of the first phase plate 110 is located on the left side relative to the phase map of the second phase plate 120. In this case, as shown in FIG. 8C, the resultant phase map of the varifocal lens 100 has a concave shape indicating a negative refractive power. Thus, in this case, the varifocal lens 100 may serve as a concave lens having a focal length of about −50 mm.

Figure 9A:
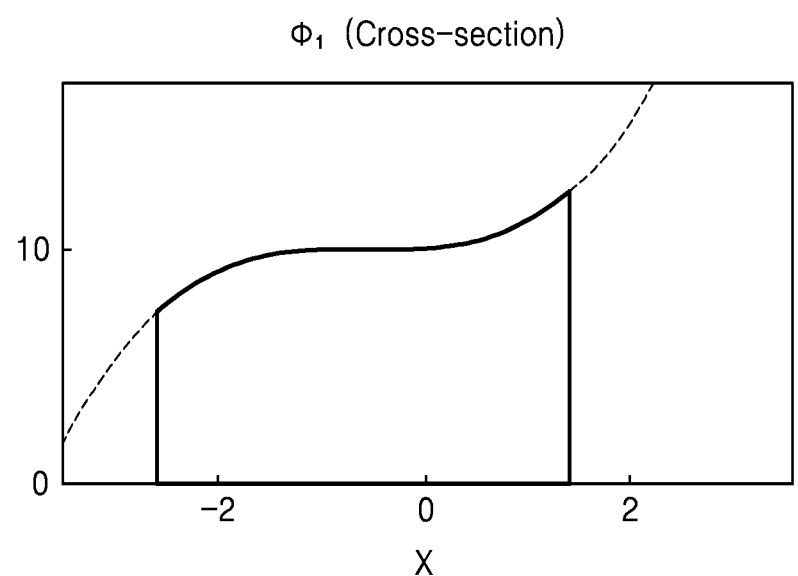
FIGS. 9A, 9B, and 9C are diagrams illustrating a phase map of transmitted light transmitted through a first phase plate, a phase map of transmitted light transmitted through a second phase plate, and a resultant phase map of transmitted light output from a varifocal lens, respectively, when the displacement between the first phase plate and the second phase plate is −0.6 mm.
Figure 9B:
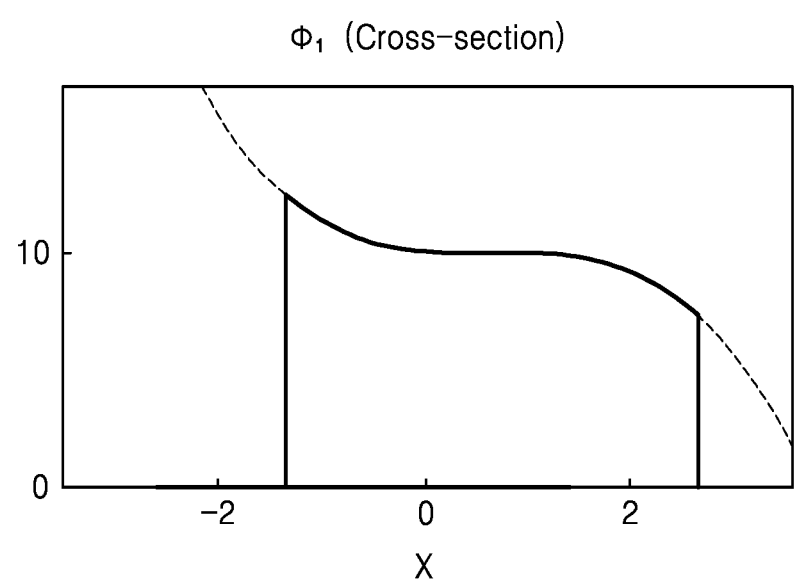
Figure 9C:
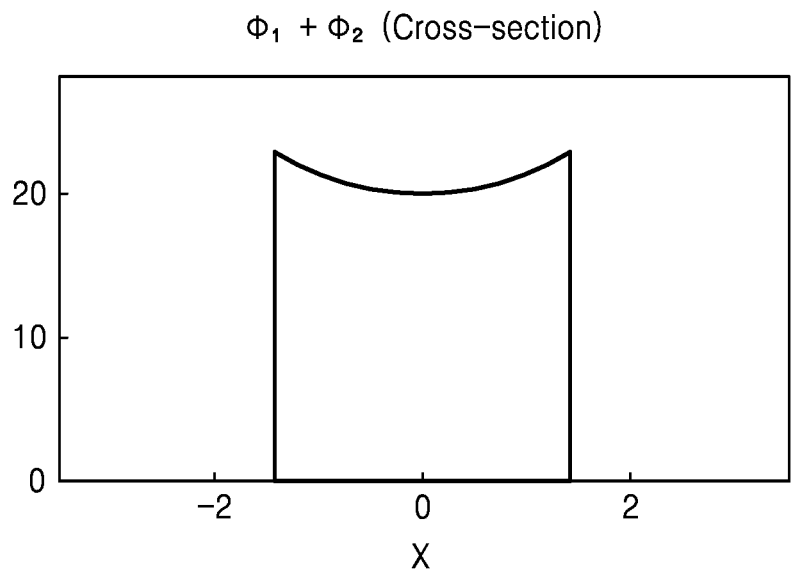

FIGS. 9A, 9B, and 9C are diagrams illustrating a phase map of transmitted light transmitted through the first phase plate 110, a phase map of transmitted light transmitted through the second phase plate 120, and a resultant phase map of transmitted light output from the varifocal lens 100, respectively, when the displacement between the first phase plate 110 and the second phase plate 120 is −0.6 mm. As shown in FIGS. 9A to 9C, when the first phase plate 110 moves farther to the left, the negative refractive power of the varifocal lens 100 may gradually increase. For example, the varifocal lens 100 may serve as a concave lens having a focal length of about −25 mm.

Figure 10:
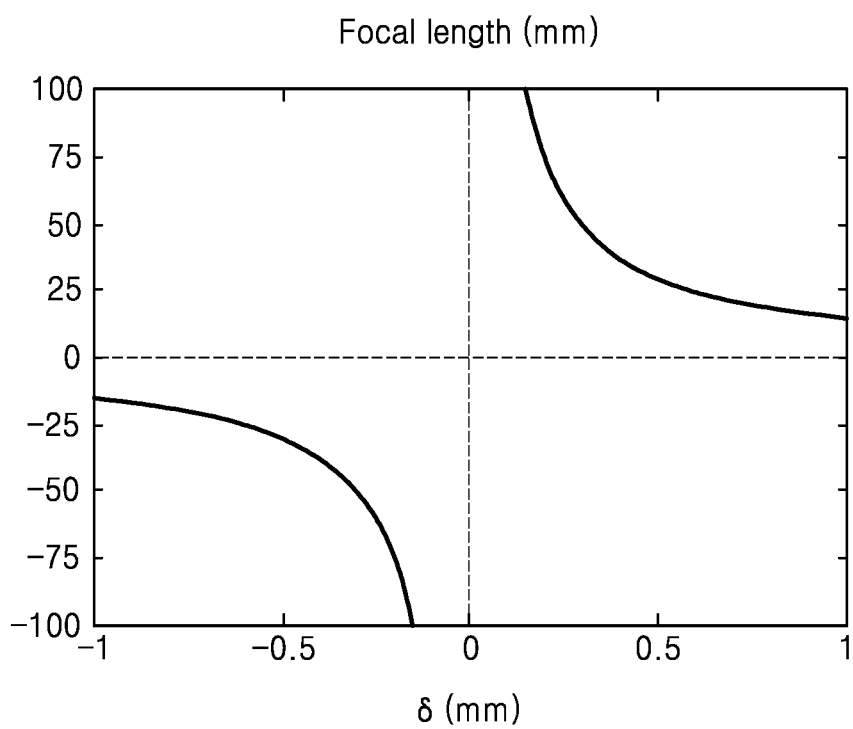
FIG. 10 is a graph showing the relationship between the displacement between a first phase plate and a second phase plate and the focal length of a varifocal lens.
Figure 11:
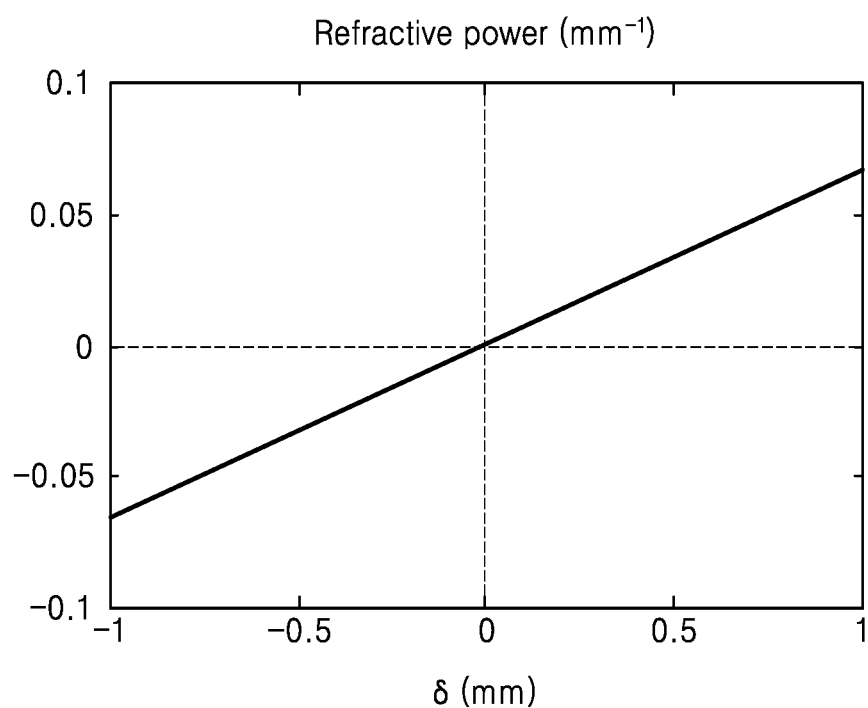
FIG. 11 is a graph showing the relationship between the displacement between a first phase plate and a second phase plate and the refractive power of a varifocal lens.

As described above, depending on the relative displacement between the first phase plate 110 and the second phase plate 120, the refractive power and focal length of the varifocal lens 100 may vary. For example, FIG. 10 is a graph showing the relationship between the displacement between the first phase plate 110 and the second phase plate 120 and the focal length of the varifocal lens 100. Referring to FIG. 10, in the positive displacement range, the varifocal lens 100 serves as a convex lens. Thus, as the displacement increases, the focal length decreases, and as the displacement decreases, the focal length increases. In particular, when the displacement is zero, the focal length is infinite. In the negative displacement range, the varifocal lens 100 serves as a concave lens. Thus, as the displacement increases, the focal length decreases, and as the displacement decreases, the focal length increases. FIG. 11 is a graph showing the relationship between the displacement between the first phase plate 110 and the second phase plate 120 and the refractive power of the varifocal lens 100. As shown in FIG. 11, it may be understood that the refractive power of the varifocal lens 100 has a linear proportional relationship with respect to the displacement. For example, when the displacement is 0, the varifocal lens 100 has a refractive power of 0, and as the displacement increases or decreases, the refractive power of the varifocal lens 100 may also increase or decrease in proportion to the displacement.

The varifocal lens 100 according to the present exemplary embodiment may be formed in a planar shape and thus may have a small thickness. For example, the varifocal lens 100 may have a small thickness of several um to several mm, although is not limited thereto and may have a thickness greater or less than several um to several mm. Thus, the varifocal lens 100 may provide a zoom function to a compact camera or a camera for a mobile device. In addition, since the varifocal lens 100 according to the present exemplary embodiment may be manufactured by a patterning method using a photolithography process, a complicated processing step for forming a complex curved surface of an optical lens element is not required. Accordingly, the varifocal lens 100 may be easily manufactured and quality deterioration due to a process error may be reduced, and thus, image quality may be improved. It is understood the varifocal lens 100 is not limited to being manufactured by using a photolithography process, and may also be manufactured using other processes instead of or in combination with a photolithography process.

Figure 12:
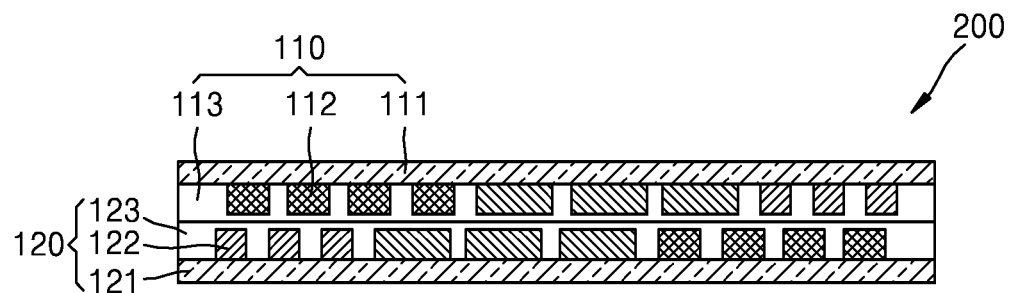
FIG. 12 is a cross-sectional view of a varifocal lens according to another exemplary embodiment.

FIG. 12 is a cross-sectional view of a varifocal lens 200 according to another exemplary embodiment. Referring to FIG. 12, the varifocal lens 200 may further include first and second dielectric layers 113 and 123 that are transparent and surround and protect first and second phase conversion elements 112 and 122. For example, a first phase plate 110 may include the first dielectric layer 113 filled between a plurality of first phase conversion elements 112, and a second phase plate 120 may include the second dielectric layer 123 filled between a plurality of second phase conversion elements 122. The first and second dielectric layers 113 and 123 may include a material such as siloxane-based spin on glass (SOG), transparent polymer material, SiO2, or the like. The first and second dielectric layers 113 and 123 may be made of many different types of materials, as would be appreciated by an artisan having ordinary skill in the art.

In order to sufficiently protect the first and second phase conversion elements 112 and 122, the thickness of the first dielectric layer 113 may be greater than the thickness of the first phase conversion element 112 to completely cover the first phase conversion element 112, and the thickness of the second dielectric layer 123 may be greater than the thickness of the second phase conversion element 122 to completely cover the second phase conversion element 122. In this case, the first and second phase conversion elements 112 and 122 may not be damaged when the first phase plate 110 and the second phase plate 120 are relatively moved. Accordingly, as shown in FIG. 12, the first phase plate 110 and the second phase plate 120 may be disposed so that the first dielectric layer 113 and the second dielectric layer 123 are in contact with each other. It is understood that a surface of the first phase plate 110 may only partially contact a surface of the second phase plate 120 (e.g., contact a portion of a surface of the second plate), or may completely contact the entire surface of the second phase plate 120.

Figure 13:
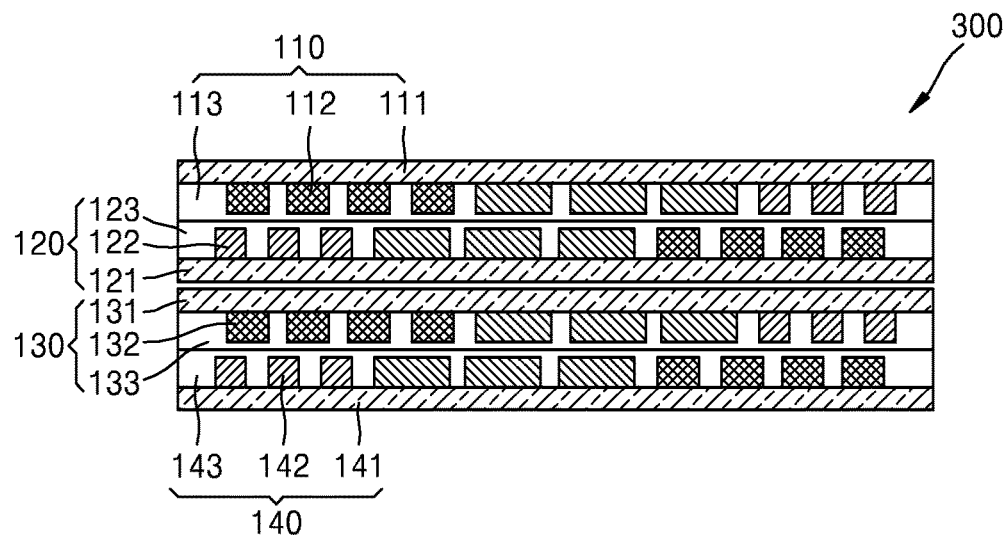
FIG. 13 is a cross-sectional view of a varifocal lens according to another exemplary embodiment.

FIG. 13 is a cross-sectional view of a varifocal lens 300 according to another exemplary embodiment. Referring to FIG. 13, the varifocal lens 300 may further include a third phase plate 130 and a fourth phase plate 140 in addition to a first phase plate 110 and a second phase plate 120. For example, the first phase plate 110, the second phase plate 120, the third phase plate 130, and the fourth phase plate 140 may be sequentially disposed along an optical axis. The third phase plate 130 may include a third substrate 131, a plurality of third phase conversion elements 132 having different sizes, and a third dielectric layer 133. The fourth phase plate 140 may include a fourth substrate 141, a plurality of fourth phase conversion elements 142 having different sizes, and a fourth dielectric layer 143.

A plurality of first phase conversion elements 112 and a plurality of second phase conversion elements 122 may be arranged so that a pair of the first and second phase plates 110 and 120 functions as a first lens element. A plurality of third phase conversion elements 132 and a plurality of fourth phase conversion elements 142 may be arranged so that a pair of the third and fourth phase plates 130 and 140 functions as a second lens element. The first phase plate 110 and the second phase plate 120 may be configured to be movable relative to each other in a direction perpendicular to the optical axis, and the third phase plate 130 and the fourth phase plate 140 may be configured to be movable relative to each other in the direction perpendicular to the optical axis. The first and second phase conversion elements 112 and 122 may be arranged so that light transmitted through the first phase plate 110 and the second phase plate 120 is focused on different positions on the optical axis depending on the displacement between the first phase plate 110 and the second phase plate 120. The third and fourth phase conversion elements 132 and 142 may be arranged so that light transmitted through the third phase plate 130 and the fourth phase plate 140 is focused on different positions on the optical axis depending on the displacement between the third phase plate 130 and the fourth phase plate 140. Accordingly, the focal length of the varifocal lens 300 may vary depending on the relative displacement between the first phase plate 110 and the second phase plate 120 and the relative displacement between the third phase plate 130 and the fourth phase plate 140.

As described above with reference to FIGS. 2 and 3, the first to fourth phase conversion elements 112, 122, 132, and 142 may have a cylindrical shape, although are not limited thereto and may have many other shapes as well. The first to fourth phase conversion elements 112, 122, 132, and 142 may have different diameters depending on positions on the first to fourth phase plates 110, 120, 130, and 140, respectively, so that the phase of light transmitted through the first to fourth phase plates 110, 120, 130 and 140 changes differently depending on the positions on the first to fourth phase plates 110, 120, 130, and 140. In this case, the arrangement of the first phase conversion elements 112 and the arrangement of the second phase conversion elements 122 may be mirror-symmetrical with respect to each other in a horizontal direction, and the arrangement of the third phase conversion elements 132 and the arrangement of the fourth phase conversion elements 142 may be mirror-symmetrical with respect to each other in the horizontal direction.

In the varifocal lens 300 according to the present exemplary embodiment, the first lens element including the pair of the first and second phase plates 110 and 120 and the second lens element including the pair of the third and fourth phase plates 130 and 140 may be designed to have different optical characteristics from each other. For example, when the displacement between the first and second phase plates 110 and 120 is equal to the displacement between the third and fourth phase plates 130 and 140, the first lens element may have a positive refractive power and the second lens element may have a negative refractive power, or the first lens element may have a negative refractive power and the second lens element may have a positive refractive power. Alternatively, the displacement between the first and second phase plates 110 and 120 and the displacement between the third and fourth phase plates 130 and 140 may be independently driven to arbitrarily select the refractive powers of the first lens element and the second lens element. Although the varifocal lens 300 is shown as having two phase plate pairs 110, 120, 130 and 140 in FIG. 13, it is not limited thereto and may have three or more phase plate pairs.

The varifocal lens 300 according to the present exemplary embodiment may accumulate the phase changes due to the first to fourth phase plates 110 to 140 to obtain a larger refractive power change effect even in the case of a small displacement. In addition, the varifocal lens 300 may function as a zoom lens having a plurality of lens elements. The third and fourth phase plates 130 and 140 may be moved in the direction of the optical axis with respect to the first and second phase plates 110 and 120. That is, a focus may be adjusted by changing the distance in an optical axis direction between the first lens element including the first and second phase plates 110 and 120 and the second lens element including the third and fourth phase plates 130 and 140.

Figure 14A:
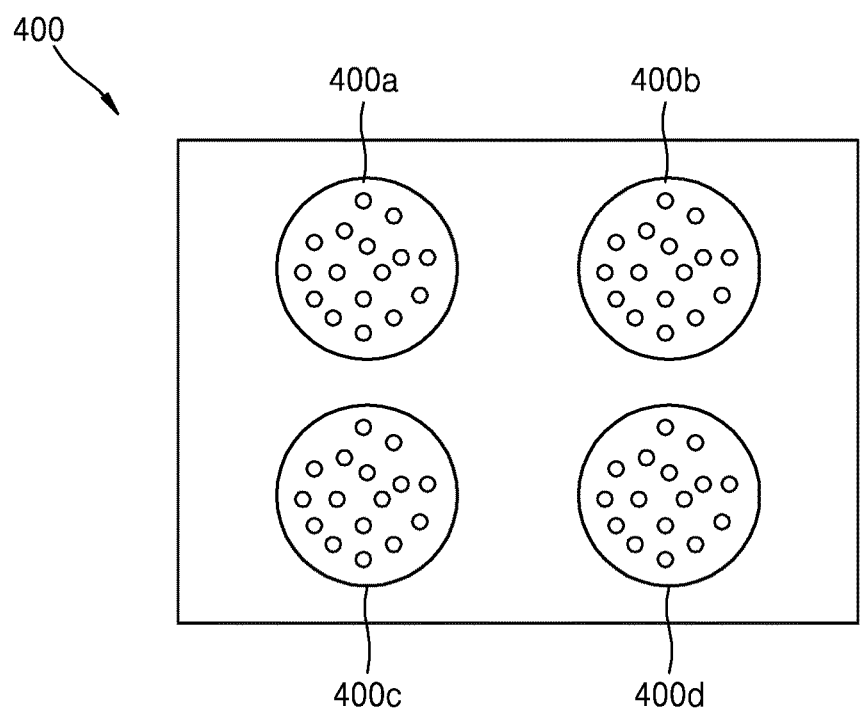
FIGS. 14A, 14B, and 14C are plan views schematically showing a configuration of a varifocal lens according to another exemplary embodiment.
Figure 14B:
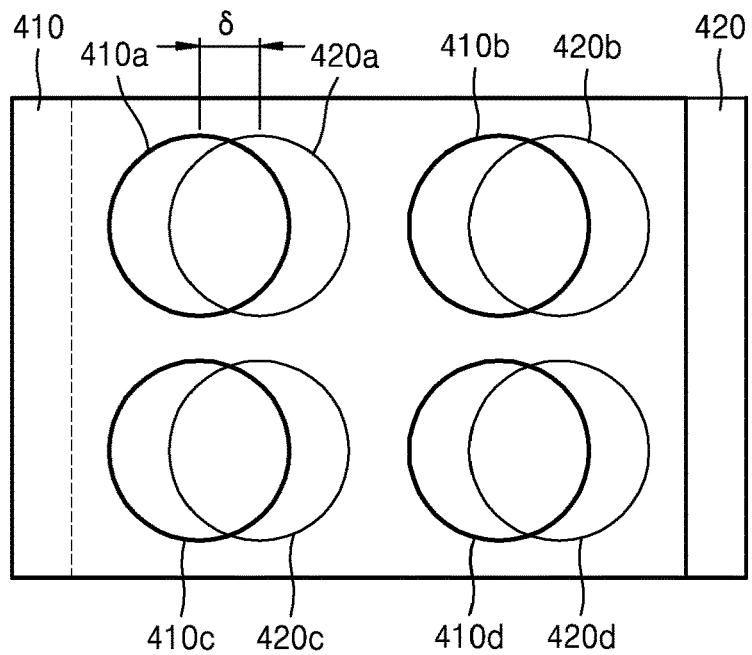
Figure 14C:
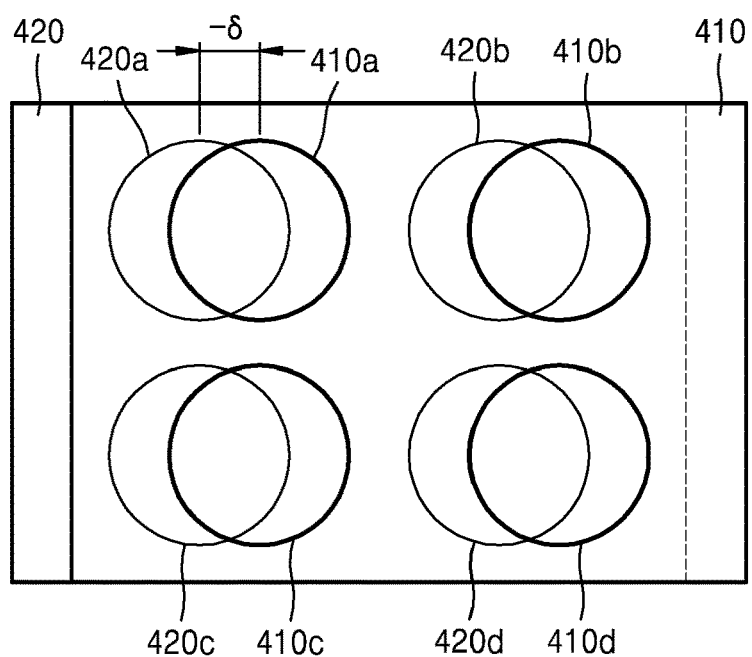

FIGS. 14A, 14B, and 14C are plan views schematically showing a configuration of a varifocal lens 400 according to another exemplary embodiment. Referring to FIG. 14A, the varifocal lens 400 may include a plurality of regions 400a, 400b, 400c, and 400d in which first and second phase conversion elements 112 and 122 are locally arranged. The first and second phase conversion elements 112 and 122 may be arranged only in the plurality of regions 400a, 400b, 400c, and 400d. The plurality of regions 400a, 400b, 400c, and 400d may be regularly two-dimensionally arranged. Thus, the varifocal lens 400 may function as a lens array in which a plurality of lens elements are two-dimensionally arranged.

Referring to FIGS. 14B and 14C, the varifocal lens 400 may include a first phase plate 410 and a second phase plate 420. The first phase plate 410 may include first to fourth regions 410a, 410b, 410c, and 410d arranged in two dimensions, and the first phase conversion elements 112 may be locally arranged only in the first to fourth regions 410a, 410b, 410c, and 410d. The second phase plate 420 may include fifth to eighth regions 420a, 420b, 420c, and 420d, and the second phase conversion elements 122 may be locally arranged only in the fifth to eighth regions 420a, 420b, 420c, and 420d. The first and second phase plates 410 and 420 may be disposed so that the first to fourth regions 410a to 410d face the fifth to eighth regions 420a to 420d, respectively. For example, the first phase plate 410 and the second phase plate 420 may be disposed so that the first region 410a and the fifth region 420a face each other, the second region 410b and the sixth region 420b face each other, the third region 410c and the seventh region 420c face each other, and the fourth region 410d and the eighth region 420d face each other.

Thus, a pair of the first and fifth areas 410a and 420a may function as a first lens element, a pair of the second and sixth areas 410b and 420b may function as a second lens element, a pair of the third and seventh regions 410c and 420c may function as a third lens element, and a pair of the fourth and eighth regions 410d and 420d may function as a fourth lens elements. The arrangements of the first phase conversion elements 112 in the first to fourth regions 410a, 410b, 410c, and 410d may be designed to be identical to each other and the arrangements of the second phase conversion elements 122 in the fifth to eighth regions 420a, 420b, 420c, and 420d may be designed to be identical to each other so that the first to fourth lens elements have the same optical characteristics. Alternatively, the arrangements of the first phase conversion elements 112 in the first to fourth regions 410a, 410b, 410c, and 410d may be designed to be different from each other and the arrangements of the second phase conversion elements 122 in the fifth to eighth regions 420a, 420b, 420c, and 420d may be designed to be different from each other so that the first to fourth lens elements have different optical characteristics. In this case, the first to fourth lens elements may have different focal lengths at a certain displacement between the first phase plate 410 and the second phase plate 420.

Figure 15:
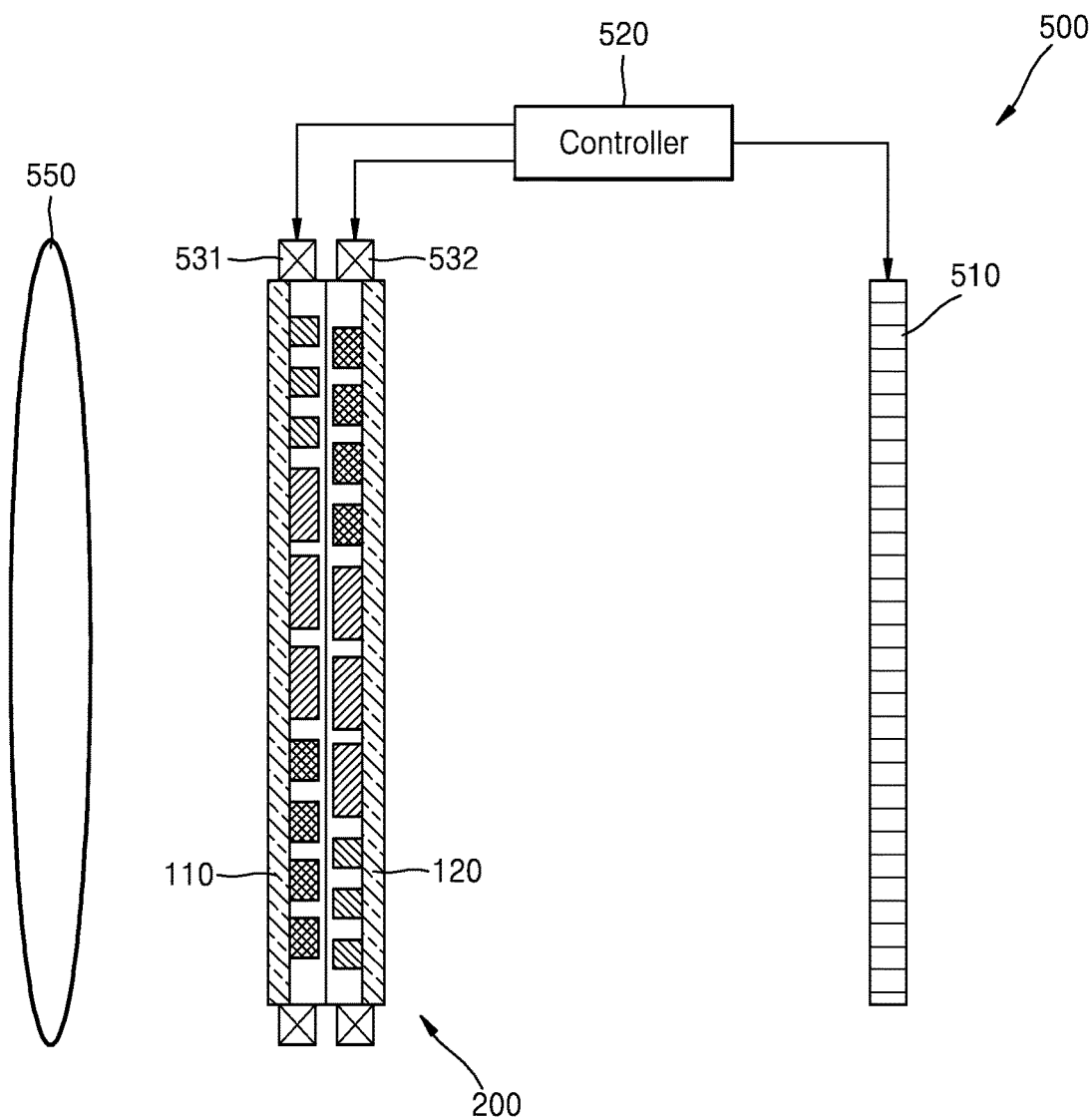
FIG. 15 is a conceptual diagram of an image acquisition apparatus according to an exemplary embodiment.

The varifocal lenses 100, 200, 300, and 400 described above may be used in an image acquisition device such as a compact camera or a camera for a mobile device. For example, FIG. 15 is a conceptual diagram of an image acquisition apparatus 500 according to an exemplary embodiment. Referring to FIG. 15, the image acquisition apparatus 500 may include a varifocal lens 200, a first actuator 531 for moving a first phase plate 110 of the varifocal lens 200, a second actuator 532 for moving a second phase plate 120 of the varifocal lens 200, a controller 520 for controlling the displacement between the first phase plate 110 and the second phase plate 120 by driving the first and second actuators 531 and 532, and an image pickup device 510 having a plurality of pixels for sensing light.

Although the varifocal lens 200 shown in FIG. 12 is illustrated in FIG. 15 by way of example, the image acquisition device 500 may include other varifocal lenses 100, 300, or 400, or some combination thereof. In addition, one of the first and second actuators 531 and 532 may be omitted in FIG. 15. In other words, both the first and second phase plates 110 and 120 may be displaced by using both the first and second actuators 531 and 532, or only one of the first and second phase plates 110 or 120 may be displaced by using only one of the first or second actuators 531 and 532. The first and second actuators 531 and 532 may be electric devices using electrostatic force or magnetic force, or may be mechanical devices. The control unit 520 may calculate displacement to obtain a desired focal length of the varifocal lens 200 according to a pre-programmed program or a user's selection, and may control the first and second actuators 531 and 532 to move the phase plates 110 and 120 by the calculated displacement. It is understood that exemplary embodiments are not limited to using the first and second actuators 531 and 532, any may instead use many other types of devices instead of or in addition to the first and second actuators 531 and 532 to displace the first and second phase plates 110 and 120.

In addition, the image acquisition apparatus 500 may use only the varifocal lens 200, or may further include an additional optical lens element 550. Although only one optical lens element 550 is illustrated in FIG. 15 by way of example, the image acquisition device 500 may use two or more optical lens elements 550 and the varifocal lens 200 together in many different combinations. Additionally, many other optical elements known to those skilled in the art (e.g., beam splitters, etc.) may also be used with the image acquisition apparatus 500.

The image capturing apparatus 500 may also perform a function of a depth sensor by taking a photograph while continuously adjusting the focal length of the varifocal lens 200. For example, since the distance of the subject varies depending on the focal length of the varifocal lens 200, a plurality of images obtained by performing photographing while continuously changing the focal length from a minimum focal length to a maximum focal length distance may be used to generate a depth map. Additionally, the image capturing apparatus 500 may further perform other functions in addition to sensing depth, such as certain types of 3-D photography, etc.

While various exemplary embodiments of a planar varifocal lens have been shown and described in connection with the exemplary embodiments illustrated in the drawings, it will be understood by those of ordinary skill in the art that various modifications and equivalent embodiments can be made therefrom. Therefore, the disclosed exemplary embodiments should be considered in an illustrative sense rather than a restrictive sense. The range of the exemplary embodiments is defined by the appended claims, and all of the differences in the equivalent range thereof should be understood to be included in the exemplary embodiments.

What is claimed is:

1. A varifocal lens comprising:
a first phase plate comprising a plurality of first phase conversion elements, at least some of the plurality of first phase conversion elements having different sizes from each other; and
a second phase plate comprising a plurality of second phase conversion elements, at least some of the plurality of second phase conversion elements having different sizes from each other,
wherein the first phase plate and the second phase plate face each other along an optical axis and are movable relative to each other in a direction perpendicular to the optical axis to create displacement between the first phase plate and the second phase plate, and the plurality of first phase conversion elements and the plurality of second phase conversion elements are configured so that light transmitted through the first phase plate and the second phase plate is focused on different positions on the optical axis depending on the displacement between the first phase plate and the second phase plate,
wherein the first phase plate further comprises a first dielectric layer provided between the plurality of first phase conversion elements and the second phase plate further comprises a second dielectric layer filled between the plurality of second phase conversion elements, and
wherein the first phase plate and the second phase plate are configured so that the first dielectric layer and the second dielectric layer are in contact with each other.

2. The varifocal lens of claim 1, wherein the first phase plate further comprises a first substrate that is transparent and the plurality of first phase conversion elements are arranged on the first substrate, and the second phase plate further comprises a second substrate that is transparent and the plurality of second phase conversion elements are arranged on the second substrate.

3. The varifocal lens of claim 2, wherein each of the plurality of first phase conversion elements and each of the plurality of second phase conversion elements comprise a material having a refractive index higher than a refractive index of the first substrate and the second substrate.

4. The varifocal lens of claim 2, wherein each of the first substrate and the second substrate has a flat plate shape, and the first phase plate and the second phase plate are arranged so that the plurality of first phase conversion elements and the plurality of second phase conversion elements face each other.

5. The varifocal lens of claim 1, wherein
each of the first dielectric layer and the second dielectric layer is transparent.

6. The varifocal lens of claim 5, wherein a thickness of the first dielectric layer is greater than thicknesses of the plurality of first phase conversion elements so that the first dielectric layer completely covers the plurality of first phase conversion elements, and
a thickness of the second dielectric layer is greater than thicknesses of the plurality of second phase conversion elements so that the second dielectric layer completely covers the plurality of second phase conversion elements.

7. The varifocal lens of claim 1, wherein each of the plurality of first phase conversion elements and each of the plurality of second phase conversion elements have a cylindrical shape.

8. The varifocal lens of claim 7, wherein the plurality of first phase conversion elements have different diameters from each other depending on positions of the plurality of first phase conversion elements on the first phase plate so that a phase of light transmitted through the first phase plate changes differently depending on the positions of the plurality of first phase conversion elements on the first phase plate, and
the plurality of second phase conversion elements have different diameters from each other depending on positions of the plurality of second phase conversion elements on the second phase plate so that a phase of light transmitted through the second phase plate changes differently depending on the positions of the plurality of second phase conversion elements on the second phase plate.

9. The varifocal lens of claim 8, wherein the diameters of the plurality of first phase conversion elements and the diameters of the plurality of second phase conversion elements are determined so that a phase of light transmitted through the first phase plate and the second phase plate satisfies an Alvarez-Lohmann condition.

10. The varifocal lens of claim 8, wherein an arrangement of the plurality of second phase conversion elements is mirror-symmetrical with an arrangement of the plurality of first phase conversion elements.

11. The varifocal lens of claim 10, wherein the first phase plate and the second phase plate are movable relative to each other in a direction perpendicular to an axis of symmetry between the plurality of first phase conversion elements and the plurality of second phase conversion elements.

12. The varifocal lens of claim 8, wherein thicknesses of the plurality of first phase conversion elements are equal to thicknesses of the plurality of second phase conversion elements.

13. The varifocal lens of claim 1, further comprising:
a third phase plate comprising a plurality of third phase conversion elements, at least some of the plurality of third phase conversion elements having different sizes from each other; and
a fourth phase plate comprising a plurality of fourth phase conversion elements, at least some of the plurality of third phase conversion elements having different sizes from each other,
wherein the plurality of first phase conversion elements and the plurality of second phase conversion elements are configured so that the first phase plate and the second phase plate collectively function as a first lens element, and the plurality of third phase conversion elements and the plurality of fourth phase conversion elements are configured so that the third phase plate and the fourth phase plate collectively function as a second lens element.

14. The varifocal lens of claim 13, wherein the first phase plate, the second phase plate, the third phase plate, and the fourth phase plate are sequentially arranged along the optical axis, the third phase plate and the fourth phase plate are movable relative to each other in a direction perpendicular to the optical axis to create displacement between the third phase plate and the fourth phase plate, and
the plurality of third phase conversion elements and the plurality of fourth phase conversion elements are configured so that light transmitted through the third phase plate and the fourth phase plate is focused on different positions on the optical axis depending on the displacement between the third phase plate and the fourth phase plate.

15. The varifocal lens of claim 14, wherein each of the plurality of third phase conversion elements and each of the fourth phase conversion elements have a cylindrical shape,
the plurality of third phase conversion elements have different diameters from one another depending on positions of the third phase conversion elements on the third phase plate so that a phase of light transmitted through each of the third phase conversion elements on the third phase plate changes differently from one another depending on the positions of the third phase conversion elements on the third phase plate, and
the plurality of fourth phase conversion elements have different diameters from one another depending on positions of the fourth phase conversion elements on the fourth phase plate so that a phase of light transmitted through each of the fourth phase conversion elements on the fourth phase plate changes depending on the positions of the fourth phase conversion elements on the fourth phase plate.

16. The varifocal lens of claim 1, wherein the first phase plate comprises a first region in which the plurality of first phase conversion elements are arranged and a second region in which the plurality of first phase conversion elements are arranged, and
the second phase plate comprises a third region in which the plurality of second phase conversion elements are provided and a fourth region in which the plurality of second phase conversion elements are provided.

17. The varifocal lens of claim 16, wherein the first phase plate and the second phase plate are configured so that the first region and the third region face each other and the second region and the fourth region face each other.

18. The varifocal lens of claim 17, wherein the plurality of first phase conversion elements and the plurality of second phase conversion elements are configured so that the first region and the second region collectively function as a first lens element and the third region and the fourth region collectively function as a second lens element.

19. The varifocal lens of claim 18, wherein an arrangement of the plurality of first phase conversion elements in the first region and an arrangement of the plurality of first phase conversion elements in the second region are identical to each other, and
an arrangement of the plurality of second phase conversion elements in the third region and an arrangement of the plurality of second phase conversion elements in the fourth region are identical to each other.

20. The varifocal lens of claim 19, wherein the first lens element and the second lens element have a same focal length as each other at a certain displacement between the first phase plate and the second phase plate.

21. The varifocal lens of claim 18, wherein an arrangement of the plurality of first phase conversion elements in the first region and an arrangement of the plurality of first phase conversion elements in the second region are different from each other, and
an arrangement of the plurality of second phase conversion elements in the third region and an arrangement of the plurality of second phase conversion elements in the fourth region are different from each other.

22. The varifocal lens of claim 21, wherein the first lens element and the second lens element have different focal lengths from each other at a certain displacement between the first phase plate and the second phase plate.

23. An image acquisition device comprising:
a varifocal lens comprising:
a first phase plate comprising a plurality of first phase conversion elements, at least some of the plurality of first phase conversion elements having different sizes from each other, and
a second phase plate comprising a plurality of second phase conversion elements, at least some of the plurality of second phase conversion elements having different sizes from each other;
an actuator configured to move the first phase plate and the second phase plate to create displacement between the first phase plate and the second phase plate;
a controller configured to control the actuator; and
an image pickup device,
wherein the first phase plate and the second phase plate face each other along an optical axis and are movable relative to each other in a direction perpendicular to the optical axis to create the displacement, and the plurality of first phase conversion elements and the plurality of second phase conversion elements are arranged so that light transmitted through the first phase plate and the second phase plate is focused on different positions on the optical axis depending on the displacement between the first phase plate and the second phase plate,
wherein the first phase plate further comprises a first dielectric layer provided between the plurality of first phase conversion elements and the second phase plate further comprises a second dielectric layer filled between the plurality of second phase conversion elements, and
wherein the first phase plate and the second phase plate are configured so that the first dielectric layer and the second dielectric layer are in contact with each other.

24. The image acquisition device of claim 23, further comprising at least one optical lens element.

25. A lens comprising:
- a first phase plate comprising a first substrate and first protrusions provided on a surface of the first substrate, the first protrusions having a refractive index which is different from a refractive index of the first substrate; and
- a second phase plate comprising a second substrate and second protrusions provided on a surface of the second substrate, the second protrusions having a refractive index which is different from a refractive index of the first substrate,
- wherein the surface of the first substrate is parallel to the surface of the second substrate and the second phase plate is movable relative to the first phase plate in a direction parallel to the surfaces,
- wherein the first phase plate further comprises a first dielectric layer provided between the first protrusions and the second phase plate further comprises a second dielectric layer filled between the second protrusions, and
- wherein the first phase plate and the second phase plate are configured so that the first dielectric layer and the second dielectric layer are in contact with each other.

26. The lens of claim 25, wherein the refractive index of the first protrusions is higher than the refractive index of the first substrate, and the refractive index of the second protrusions is higher than the refractive index of the second substrate.

27. The lens of claim 26, wherein the first protrusions are arranged in a first pattern, the second protrusions are arranged in a second pattern, and the first pattern matches the second pattern.

* * * * *